United States Patent [19]
Houston

[11] Patent Number: 5,679,886
[45] Date of Patent: Oct. 21, 1997

[54] TEST HEAD ASSEMBLY FOR AND METHOD OF TESTING HEAT EXCHANGER COMPONENTS

[76] Inventor: James L. Houston, 3534 E. 109 St. S., Tulsa, Okla. 74137

[21] Appl. No.: 576,127

[22] Filed: Dec. 21, 1995

[51] Int. Cl.$^6$ .................................................. G01M 3/28
[52] U.S. Cl. .................. 73/49.1; 73/49.5; 73/49.8
[58] Field of Search .................. 73/49.1, 49.4, 73/49.6, 49.8, 49.5

[56] References Cited

U.S. PATENT DOCUMENTS

| | | | |
|---|---|---|---|
| 3,181,347 | 5/1965 | Ohmstede | 73/49.1 |
| 3,388,588 | 6/1968 | Vincenot | 73/49.6 |
| 3,566,675 | 3/1971 | Ledebur | 73/49.5 |
| 4,182,160 | 1/1980 | Powers et al. | 73/49.5 |
| 4,311,038 | 1/1982 | Dunn | 73/49.8 |
| 4,587,836 | 5/1986 | Hewlett | 73/49.8 |

*Primary Examiner*—Michael Brock
*Attorney, Agent, or Firm*—Frank J. Catalano; Scott R. Zingerman

[57] ABSTRACT

A test head assembly for heat exchanger tube bundles consists of a structural frame to support the bundle, test heads, sealing devices between the test heads and the tube sheets, clamps securing the test heads to the bundle with the sealing devices therebetween, a supply reservoir for the test fluid, a collection reservoir to receive the test fluids after testing to permit proper environmental disposal, a control station, pumping assemblies and related equipment. The structural frame is suitable for holding various common arrays of tube bundles for heat exchangers in a test configuration. The sealing devices include two sealing plates, preferably flat discs, mounted on opposite ends of the assembly and biased toward each other either hydraulically or mechanically, hydraulics being the most desirable biasing force, and two sealing rings, each typically a short cylinder of the proper outer diameter to fit the gasket surface of the bundle between the seal plates and the ends of the bundle to be tested. The assembly is designed to permit a visual inspection of the bundle for leaks and may be, stationary, skid, hoist, crane or trailer mounted. Using the assembly above described, a tube bundle or other component can be tested on or off site in approximately one-half hour. The test assembly can be used repeatedly for a wide variety of bundle configurations and components and, in trailer mounted or overhead suspension embodiments, at any needed location.

19 Claims, 4 Drawing Sheets

TEST HEAD ASSEMBLY FOR AND METHOD OF TESTING HEAT EXCHANGER COMPONENTS

BACKGROUND OF THE INVENTION

This invention relates generally to heat exchangers and more particularly concerns the testing of heat exchanger components independently of their heat exchanger.

Heat exchangers, sometimes called condensers, reboilers, coolers, boilers and surface condensers, for example, consist of a bundle of tubes integrally fitted together and inserted in a cylindrical shell to form a singular piece of equipment which allows two fluids to cross flow, one through the bundle and one through the shell, without coming in contact with each other, for the purpose of thermal exchange between the fluids. A leak resulting in comingling of the two fluids or emission of a fluid to the atmosphere can be disastrous. Consequently, heat exchangers are shut down periodically for cleaning and inspection and replacement of worn or defective tubes.

In present practice, when on-line bundles are found to be defective or are due for scheduled maintenance, the bundle is pulled from its shell and transferred to a designated station on or off-site for cleaning. After cleaning, the bundle is manually inspected for wear and corrosion and necessary repairs or replacements are made. The bundle is then reinstalled in its shell and in-line tested. If the bundle does not test satisfactorily, the leak is difficult, if not impossible, to locate without again removing the bundle from its shell and repeating the process. Furthermore, the on-line test can require special test heads and other equipment which, afterwards, are often relegated to a scrap pile. The process can take one or more days to complete, normally resulting in shut down not only of the heat exchanger but also of its associated process unit, a time consuming and very expensive burden. Other heat exchanger components require similar test processes.

While it is desirable to test these tube bundles and other components prior to installation and also during the cleaning and inspection procedure, this is generally not economical, the test fixtures often being more expensive than the bundles or other components being tested. Hitherto, the only known method to test a tube bundle or other component independent of it's shell has been to use expensive heads specifically designed for a single test. As a result, despite the risks above described, the industry normally waives testing and installs untested bundles and components.

It is therefore an object of this invention to provide an assembly and method affording an economical means to test heat exchange tube bundles and other components independently of their heat exchanger. Another object of this invention is to provide an assembly and method facilitating full hydrostatic testing of heat exchanger tube bundles and other components independently of their shell, channel or other connections and covers. It is also an object of the present invention to provide an assembly and method affording full inspection access to a heat exchange tube bundle or other components during testing. A further object of this invention is to provide an assembly and method which will facilitate testing of heat exchanger tube bundles and other components prior to their installation. Another object of this invention is to provide an assembly and method by use of which a heat exchanger tube bundle or other component can be rapidly tested. Yet another object of this invention is to provide an assembly for testing heat exchanger components which is readily transportable to the heat exchanger site. And it is an object of this invention to provide an assembly for testing heat exchanger components which is easily adapted to accommodate components of various sizes.

SUMMARY OF THE INVENTION

In accordance with the invention, a test head assembly for heat exchanger tube bundles consists of a structural frame to support the bundle, test heads, sealing devices between the test heads and the tube sheets, clamps securing the test heads to the bundle with the sealing devices therebetween, a supply reservoir for the test fluid, a collection reservoir to receive the test fluids after testing to permit proper environmental disposal, a control station, pumping assemblies and related equipment.

The structural frame is suitable for holding various common arrays of tube bundles for heat exchangers in a test configuration. The sealing devices include two sealing plates, preferably flat discs, mounted on opposite ends of the assembly and biased toward each other either hydraulically or mechanically, hydraulics being the most desirable biasing force, and two sealing rings, each typically a short cylinder of the proper outer diameter to fit the gasket surface of the bundle between the seal plates and the ends of the bundle to be tested. The cylinders are machined to receive O-ring seals or gaskets on their end surfaces so as to assure pneumatically discrete connection between the tube sheet and the test heads. Cylinders fabricated in assorted sizes can be stored on the assembly and selected to suit the configuration of the bundle to be tested. The assembly may employ independent hydraulically or mechanically operated clamps that are adjustable to connect the test heads and seal to the tube sheet or, alternatively, may employ either hydraulic or mechanical force from opposing ends of the bundle to clamp the test heads and seal rings to the tube sheets. One test head will normally be fixed and the other adjustable for various bundle lengths. Both heads will have limited retraction movement to provide for set up and fast draining of the bundles. A sump or reservoir surrounding the bottom of the fixture permits recovery of any test fluids for reuse or treatment to meet EPA or special test requirements. An assortment of jigs and blocks are used to secure the various common bundle arrays in the assembly. These are adjusted or fabricated as required to fit the specific array. A combination of hydraulic and hydrostatic pumps are employed, the hydrostatic pumps to fill and test the equipment and the hydraulic pumps to control, clamp and support the assembly. Mechanical means could be used but would not be as economical. The assembly is designed to permit a visual inspection of the bundle for leaks and may be, among other suitable mounting arrangements, stationary, skid, hoist, crane or trailer mounted to facilitate field projects. If the assembly incorporates a trailer as an integral part, the trailer wheels are retractable to allow for the additional loading required when a test is being performed.

When used in testing, the tube bundle is installed onto the support of the structural frame. The appropriate test plate and sealing rings for the configuration of bundle to be tested are installed on the test heads. O-ring type seals are preferred but other type seals can be used. If the clamping mechanisms are not permanently fixed to the test heads, the appropriate number of clamping mechanisms to accommodate the configuration and the bundle and the test pressure to be applied are mounted at appropriate positions in the test heads. The clamping mechanisms are then engaged with the tube sheets. With the bundle and the seal rings in place, force is applied against the seal plates by the clamps suitable to withstand the required test pressure in the bundle. The bundle is then tested with water, air or any suitable test medium. The bundle is rapidly filled through a large port in the center of the test head. At least one of the sealing rings has a vent through its top and a drain through its bottom. A high pressure source is connected to this vent. When the bundle is full it vents through this connection. The operator then closes the valve to the fast fill port and applies the required test pressure to the bundle through the vent. When the test is complete, the operator releases the test clamps and retracts or removes the test heads. This allows the water or other test fluid to rapidly dump into the reservoir below the supports. The test water or fluid is completely contained, permitting reuse or proper testing for environmentally safe disposal.

Using the assembly above described, a tube bundle or other component can be tested in approximately one-half hour. The test assembly can be used repeatedly for a wide variety of bundle configurations and components and, in the trailer mounted or overhead suspension embodiments, at any needed location.

BRIEF DESCRIPTION OF THE DRAWINGS

Other objects and advantages of the invention will become apparent upon reading the following detailed description and upon reference to the drawings in which.

While the invention will be described in connection with a preferred embodiment and method, it will be understood that it is not intended to limit the invention to that embodiment and method. On the contrary, it is intended to cover all alternatives, modifications and equivalents as may be included within the spirit and scope of the invention as defined by the appended claims.

DETAILED DESCRIPTION

Figure 1:
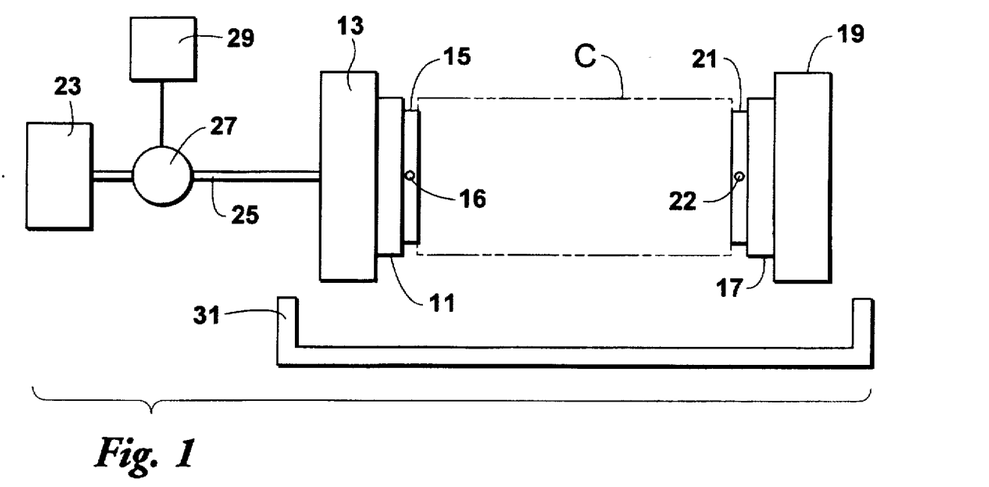
FIG. 1 is a block diagram illustrating the basic components of the heat exchanger test head assembly.

Turning first to FIG. 1, an assembly for testing the fluid containment integrity of a heat exchanger component C independently of its heat exchanger is illustrated. A first plate 11 is geometrically configured to cover an opening on one side of the heat exchanger component C. A first head 13 is adapted to support the first plate 11 and brace it against forces exerted in a direction normal to it. A first ring 15 is aligned between the first plate 11 and the first opening on a continuous path along a perimeter of the first opening to seal the junction of the first plate 11 and the component C against seepage of test fluid. A second plate 17 is geometrically configured to cover an opening on the opposite side of the heat exchanger component C. A second head 19 is adapted to support the second plate 17 and brace it against forces exerted in a direction normal to it. A second ring 21 is aligned between the second plate 17 and the second opening on a continuous path along a perimeter of the second opening to seal the junction of the second plate 17 and the component C against seepage of test fluid. Test fluid from a source reservoir 23 is fed through an hydraulic system 25 to the component C by use of a pump system 27 in response to an operator's manipulation of a control panel 29. Test fluid which seeps or is released from the component C is contained in a collection reservoir 31 beneath the component C.

In testing the fluid containment integrity of the heat exchanger component C, an operator will select plates 11 and 17 of diameter greater than the diameters of their respective fluid inlets to be covered and rings 15 and 21 of diameter not greater than the diameter of their respective plates 11 and 17 and not less than the diameter of their respective fluid inlets to be covered. The rings 15 and 21 are then sandwiched between the plates 11 and 17 and the outer perimeters of the inlets to be covered. The plates 11 and 17 are then clamped to the component C with the rings 15 and 21 therebetween to provide an hydraulically discrete chamber. Test fluid is then injected under pressure through a port into the chamber while air is simultaneously ejected from another port out of the chamber such as an outlet port 16 or 22 in the sealing ring 15 or 21 until test fluid is also ejected from the other port. One of the ports is then closed and additional test fluid injected under pressure through the other port until a preselected pressure level is reached in the chamber. The preselected pressure level is maintained for a predetermined time period during which the component C is inspected for leakage of test fluid. When testing is complete, the plates 11 and 17 are unclamped from the inspected component C to break the seal of the hydraulically discrete chamber, releasing the test fluid for collection in the reservoir 31 beneath the component C together with any fluid that may have seeped from the chamber during the test.

Figure 2:
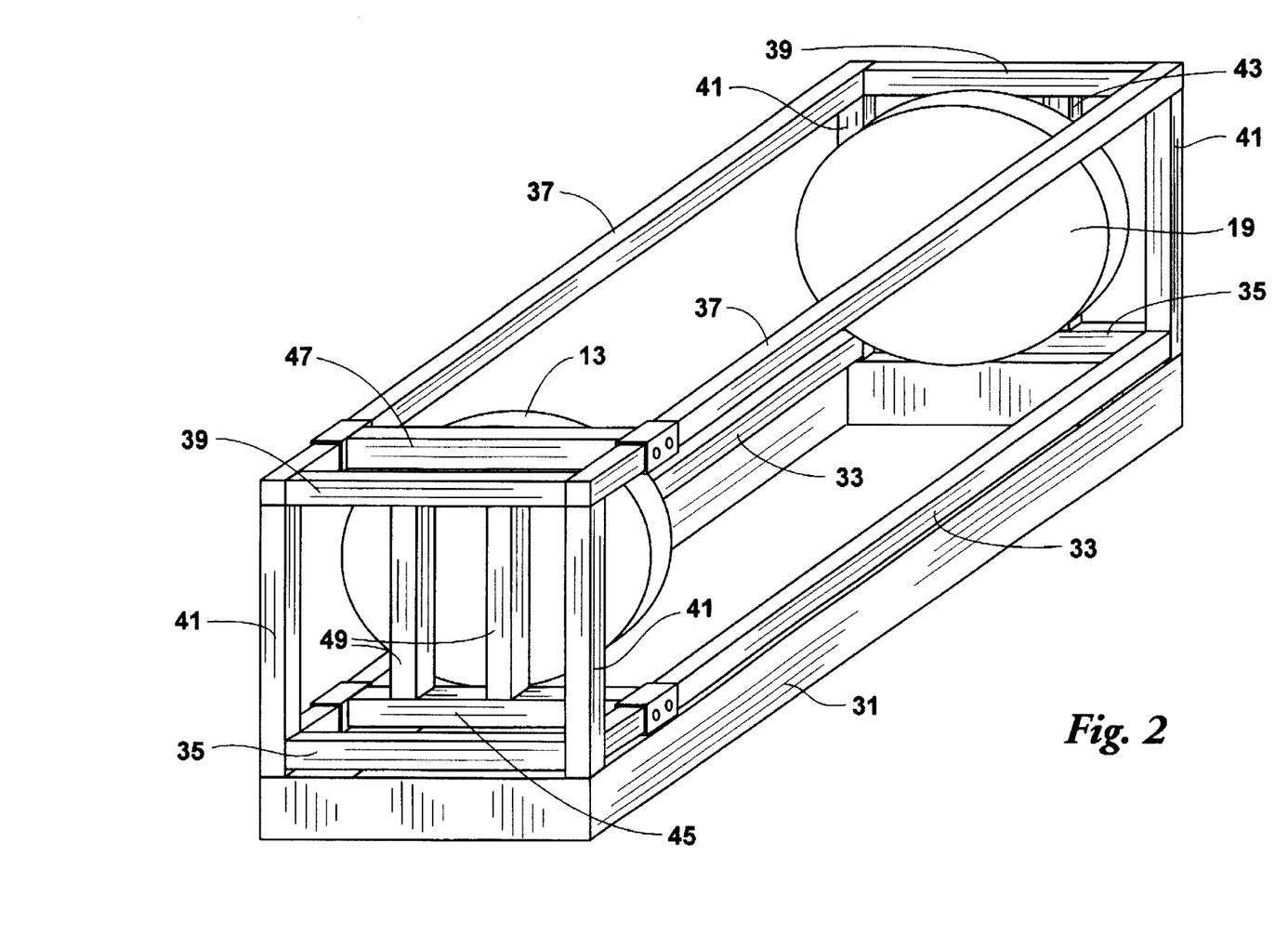
FIG. 2 is a perspective view of a frame and fluid collection reservoir of the heat exchanger test head assembly.
Figure 3:
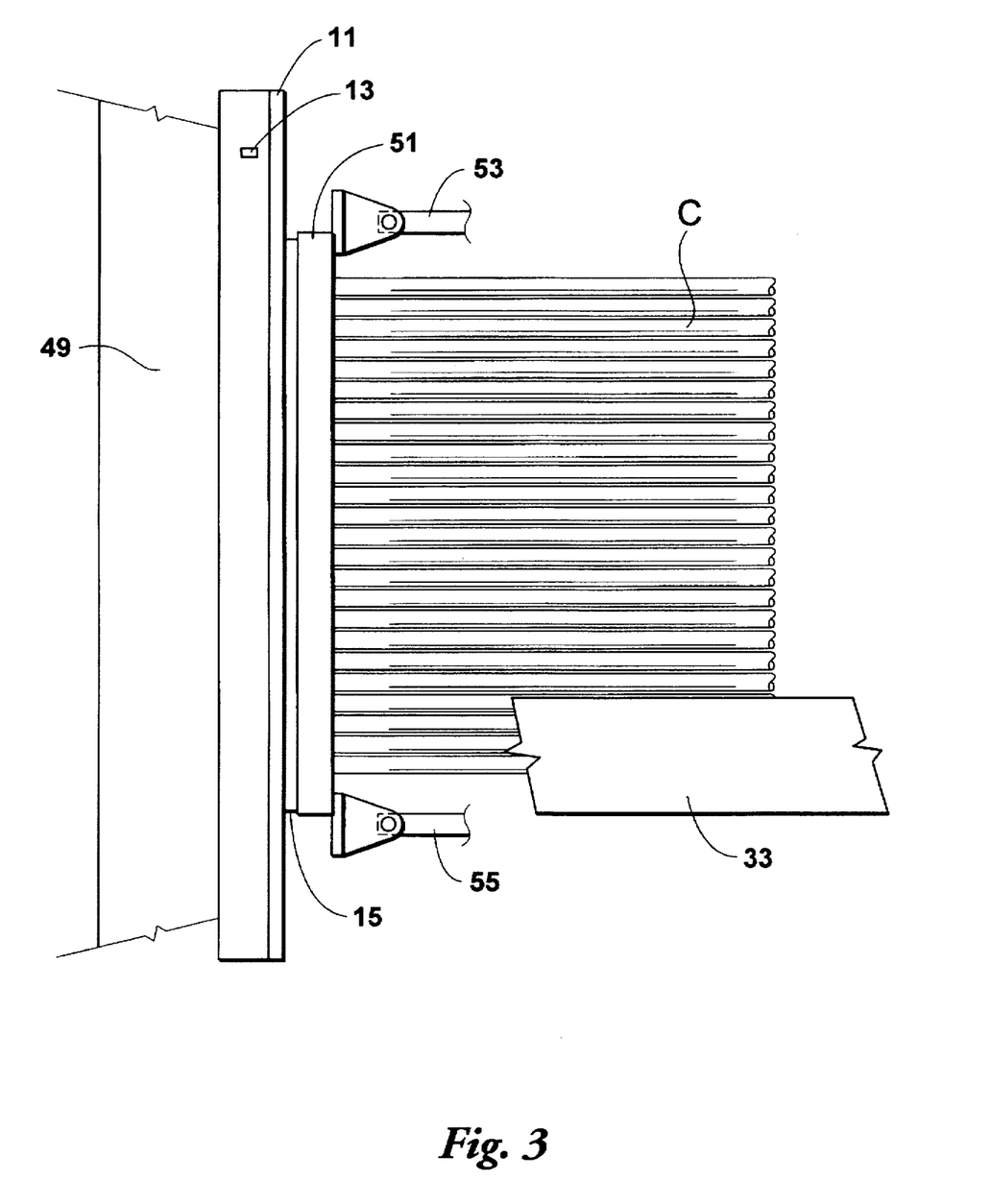
FIG. 3 is a side elevation view of a sealing assembly of the heat exchanger test head assembly.

Looking now at FIGS. 2 and 3, a preferred framing arrangement for supporting a heat exchanger component and the test heads 13 and 19 during the test process is illustrated.

In this embodiment, the base of the frame consists of longitudinal and transverse bars 33 and 35 connected in rectangular configuration and located above the fluid collection reservoir 31. The top of the frame consists of a similar structure of longitudinal and transverse members 37 and 39 spaced above the base by uprights 41. At one end of the frame, support bars 43, as shown connected between the base and top transverse bars 35 and 39 support the test head 19. Preferably, at the opposite end of the frame, a movable support assembly is used such as the lower and upper transverse members 45 and 47 which are slidably mounted on the longitudinal lower bars 33 and upper bars 37, respectively. Vertical support bars 49 extend between the sliding horizontal bars 45 and 47 and the test head 13 is mounted on the vertical bars 49. Thus, as can best be seen in FIG. 3, when the heat exchanger component C, such as a tube bundle is supported by the longitudinal supports 33, the test head 13 on the sliding frame can be slid into position to secure the component C between the test heads 13 and 19. Preferably, this will be accomplished by the application of an hydraulic piston cylinder arrangement to the sliding frame or the test head 13 to move the test head 13 closer to or further away from the other test head 19. Also as can best be seen in FIG. 3, with the test heads 13 and 19 properly positioned in relation to the component C and the plates 11 and rings 15 properly positioned between the test head and the component flange 51, the clamping mechanisms 53 and 55 can be operated to secure the assembly to the component C in pneumatically discrete connection.

In practice, as shown, the frame will be assembled around the components C to secure the components C within the frame. Alternatively, the top portion of the frame may be hingedly or slidedly connected to the remainder of the frame to permit insertion of the component C.

Figure 4:
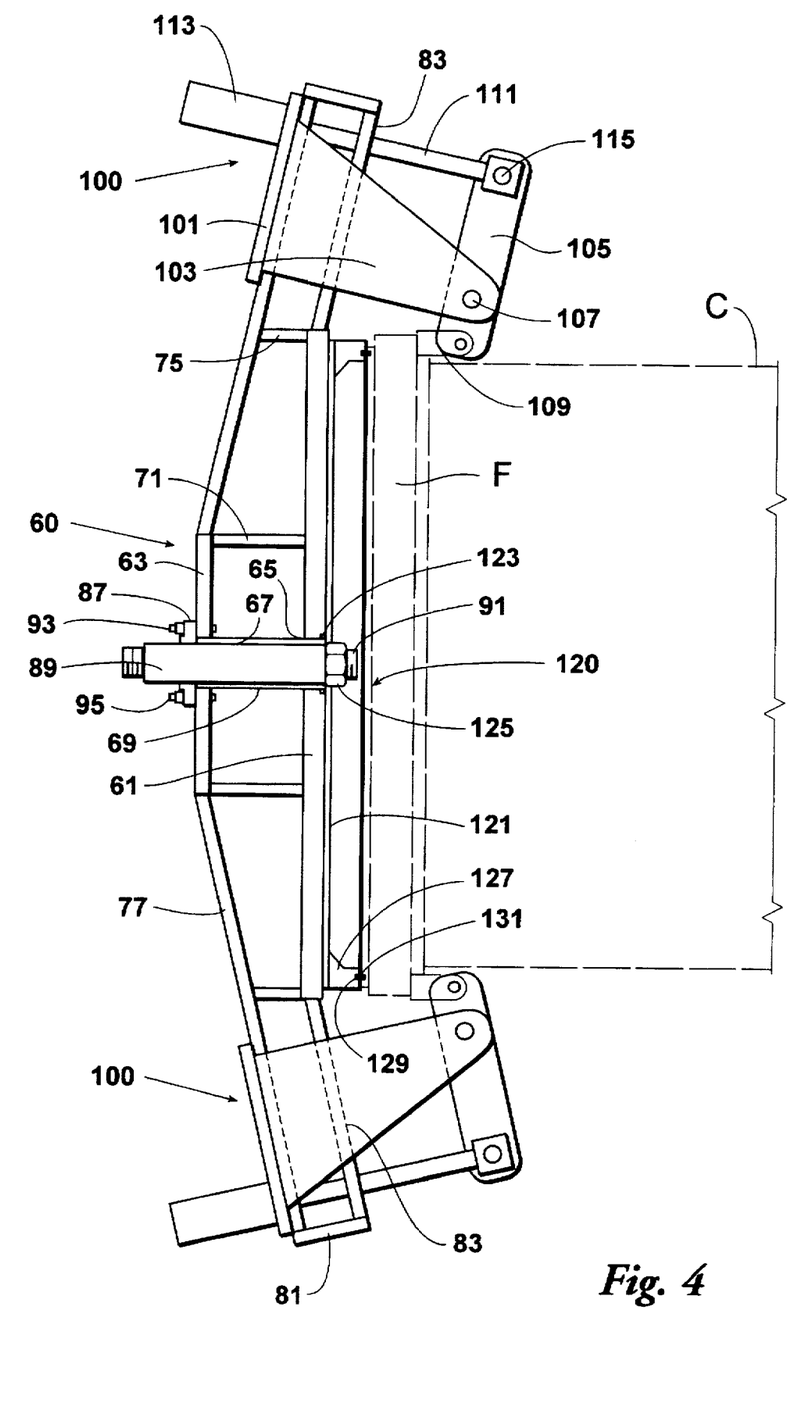
FIG. 4 is a diametric cross-sectional view of a preferred embodiment of a test head of the heat exchanger test head assembly.
Figure 5:
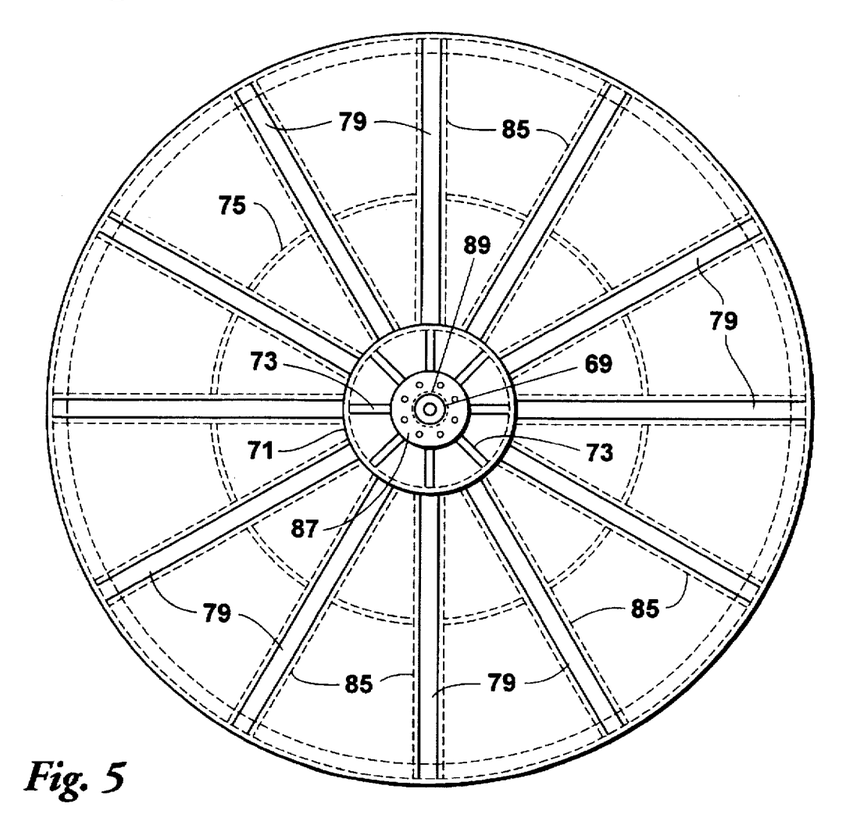
FIG. 5 is a front elevation view of the test head of FIG. 4.

Turning next to FIGS. 4 and 5, a preferred embodiment of the tube bundle test head usable with the frame of FIGS. 2 and 3 or in any other mounting arrangement including hoist or crane applications is illustrated. A brace 60 supports a plurality of clamps 100 spaced around a centrally mounted sealing assembly 120. The seal 120, reinforced by the brace 60, caps the open end of the heat exchanger and is held pneumatically tight against the heat exchanger by the clamps 100 which engage a flange or tube sheet 51 on the heat exchanger perimeter.

The brace 60 could be formed as an integral member, such as a solid piece of forged steel. However, to reduce the weight of the apparatus, the brace 60 will preferably have a skeletal structure. A large diameter base plate 61 and a small diameter top plate 63 have holes 65 and 67 through their centers and are held in spaced apart relationship by a reinforcing pipe 69 welded in the holes 65 and 67 and by a reinforcing cylinder 71 of outer diameter equal to the diameter of the top plate 63 welded in place between the plates 61 and 63 and concentrically about the pipe 69. To further reinforce this structure, a plurality of rectangular plates 73 are also welded radially between the pipe 69 and the cylinder 71. A reinforcing ring 75 having a diameter equal to the diameter of the base plate 61 is welded to the same side of the base plate 61 as the reinforcing cylinder 71. The height of the ring 75 may be the same as that of the cylinder 71 but is preferably substantially less than the height of the cylinder 71. The ring 75 is divided into segments by a plurality of longitudinal slots spaced at substantially equal angular intervals about the circumference of the ring 75. As shown, the ring 75 is divided into twelve segments by slots at thirty degree intervals. A plurality of elongated pie shape top plates 77 extend from the perimeter of the top plate 65 across and for a radial distance substantially beyond the reinforcing ring 75. Since the ring 75 is preferably shorter than the cylinder 71, the pie shaped plates 77 will slope from the top plate 63 towards the base plate 61. The number and shape of pie shaped plates 77 is such that, when all of the pie shaped plates 77 are welded to the circumference of the top plate 63 and to the edges of the reinforcing rings 75, the radial edges of the pie shaped plates 77 define a plurality of the radial slots 79 which are in registration with the longitudinal slots in the reinforcing cylinder 71. An outer ring 81 in the shape of a truncated cone is welded to the outer edges of the top plates 77, the slope of the cone being such that the ring 81 is substantially perpendicular to the face of the pie shaped top plates 77. A plurality of pie shaped base plates 83 are welded in place between the outer edge of the base plate 61 and the narrow diameter edge of the conical outer ring 81. The height of the outer ring 81 is such that the pie shaped base plates 83 lie in substantially parallel relationship to the pie shaped top plates 77. The number and shape of pie shaped base plates 83 is such as to define a second plurality of radial slots equally angularly displaced and in registration with the slots between the pie shaped top plates 77. In addition, radial slots in the base plate 61 align with and extend the slots between the pie shaped base plates 83 inwardly, approximately to the outer edge of reinforcing cylinder 71. For additional reinforcing, radial plates 85 are welded along opposite sides of each of the slots 79 and between the base plates 61 and 63 and the top pie shaped plates 77. To complete the brace 60, a flange 87 is welded to the outer circumference of a section of pipe 89. The pipe 89 is of outer diameter such as to easily but somewhat snugly slide into the reinforcing pipe 69 and is of length such that when the flange 87 abuts the top plate 63, a threaded end 91 of the pipe 89 extends beyond the base plate 61. The pipe 89 is held in place by a plurality of threaded studs 93 which extend from the top plate 63 through apertures provided in the flange 87 to a plurality of nuts 95. The brace 60 of one typical test apparatus is approximately ninety inches in overall diameter. The base plate 61 is approximately 52 inches in diameter and the top plate 63 is approximately 20 inches in diameter. The distance between the base plate 61 and the top plate 63 is approximately 10 or 11 inches. The plates 61, 63, 77 and 83 and rings 69, 71, 75 and 81 are typically in a range of ¾ to 1½ inch thick steel. As shown, the top pie shaped plates 77 are at an angle of approximately ten degrees in relation to the base and top plates 61 and 63. However, the pie shaped plates 77 and 83 could be parallel to the base plate 61, in which case the outer ring would be cylindrical, or might incline at an angle of fifteen degrees or more. The inclined relationship does generally improve the operation and effectiveness of the device. Depending on the normal application for a given test apparatus, its skeletal or integral structure could vary considerably from that described. The size and shape of the exchanger and the test pressure levels are factors to be considered in determining the necessary strength and configuration of the brace.

Each clamp 100 includes a bracket formed from a base plate 101 with a normal plate 103 welded to one of its faces. As shown, the base plate 101 slides on the outer face of the top pie shaped plates 77 with the normal plate 103 extending through the slot 79 in brace 60. Preferably, the thickness of the normal plate 103 is such that the normal plate 103 fits snugly but slidably in its slot 79. Thus, the bracket can be positioned in its slot 79 at any desirable radial distance from the center of the brace 60. In a preferred embodiment of the clamp 100, the normal plate 103 supports a linkage plate 105 which is connected to the normal plate 103 by a pivot pin 107. One end of the linkage plate 105 has a shoe 109 pivotally connected to it. The shoe 109 is adapted to abut a portion of the outer face of the component C to be tested. As shown, the shoe 109 abuts a flange F or tube sheet on the component C. The other end of the linkage plate 105 is connected to the rod 111 of a piston cylinder device 113 mounted on the base plate 101, the rod 111 being connected to the linkage plate 105 by a pivot pin 115. The assembly can include as many clamping mechanisms 100 as there are slots 79 through the brace to accommodate. Preferably, the piston cylinder device 113 will be hydraulically operated, though pneumatics or motor driven or other types of devices may be used.

The sealing assembly 120 includes a sealing plate 121 of diameter not greater than the diameter of the base plate 61 of the brace 60, but of diameter greater enough to cover the inlet to the component C to be tested. Preferably, the plate 121 will be of minimal diameter necessary to accomplish this task so that the clamps 100 can be radially inwardly positioned as close to the center of the brace 60 as possible. The plate 121 has a central aperture therethrough for receiving the threaded end 91 of the pipe 89 through the brace 60. Preferably, an annular seat in the base plate 61 of the brace 60 holds an O-ring 123 to seal the connection between the brace base plate 61 and the sealing plate 121. The sealing plate 121 is secured in position against the brace base plate 61 by a nut 125 threaded onto the threaded end 91 of the pipe 89. The sealing assembly 120 also includes a sealing ring 127 of diameter suitable to be seated about the perimeter of the sealing plate 121 on one side and to abut the face surrounding the inlet to the component C to be tested on the other side. As shown, an annular seat 129 in the face of the ring 127 supports an O-ring 131 to seal the engagement between the O-ring 127 and the flange F of the component C to be tested. As shown, the sealing ring 127 is welded to the sealing plate 121. However, the ring 127 need not be secured to the sealing plate 121 so that any of a plurality of varying diameters of sealing rings 127 might be used with the same sealing plate 121. If the sealing ring 127 is independent of the plate 121, the face of the ring 127 abutting the plate 121 may also be provided with an annular seat to receive another O-ring to assure a tight seal between the ring 127 and the plate 121.

In mounting the assembly illustrated in FIGS. 4 and 5 to the heat exchanger component C to be tested, a sealing plate 121 of diameter greater than the diameter of the fluid inlet of the component C to be tested is selected. Preferably, this plate 121 will also be of least diameter possible. The selected plate 121 is mounted on the brace 60 by sealing the O-ring 123 in the brace base plate 61, sliding the plate 121 over the threaded end 91 of the pipe 89 and securing the plate 121 in place with the nut 125. With the plate 121 thus positioned against the brace 60, the brace 60 assures that the plate 121 will not be distorted or damaged as a result of the pressure that will be applied to the plate 121 in the test process. A sealing ring 127 of diameter not greater than the diameter of the selected plate 121 and not less than the diameter of the fluid inlet of the component C to be tested, is then selected and sandwiched between the sealing plate 121 and the outer perimeter of the fluid inlet of the component C to be tested. In placing the ring 127 in its sandwiched relationship, one or more O-rings 131 will also be seated on either side of the sealing ring 127. With the sealing assembly 120 thus placed, the brace 60 is clamped to the component C to be tested with the plate 121 and the ring 127 therebetween to provide an hydraulically discrete chamber for testing. In clamping the brace 60 to the component C, the number of clamps 100 required to maintain the sealing assembly 120 in hydraulically discrete contiguity under the test pressures to be applied to the heat exchamber component C is calculated. The calculated number of clamps 100 are then mounted at intervals in the slots 79 in the brace 60 at a radial distance from the center of the brace greater than the radius of the plate 121 but at as short a radius as possible to maximize the grip of the clamps 100 on the flange F of the component C to be tested. With the bases 101 of the clamp brackets seated against the brace 60, the shoes 109 are abutted against the component C to be tested. The clamp linkages 105 are then moved to draw the shoes 109 toward the brace 60 so as to firmly grip the plate 121 and the ring 137 between the base plate 61 of the brace and the flange F of the component C to be tested. It should be noted that the angular position of the top plates 77 of the brace 60 angle the clamps 110 inwardly toward the component C to be tested, thus maximizing the efficiency of the clamping action. Preferably, a hole through the clamping ring 127 permits venting of the air out of the component C to be tested as test fluid is injected through the pipe 89 into the component C to be tested by the hydrostatic pumping system 27 illustrated in FIG. 1.

Thus, it is apparent that there has been provided, in accordance with the invention, a test head assembly and method that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An assembly for testing the fluid containment integrity of heat exchanger components independently of the heat exchanger comprising:

a plate of geometric configuration adapted to cover a fluid inlet into the heat exchanger component to be tested;

a brace having a plurality of slots therein;

means alignable between said plate and the fluid inlet on a continuous path along a perimeter of the fluid inlet for sealing a junction of said plate and the component against passage of test fluid therethrough;

a shoe adapted to abut a portion of an outer face of the component;

a bracket adapted for slidable engagement in one of said slots in said brace;

a linkage pivotally connecting said shoe and said bracket;

means connected to said bracket and to said linkage for pivoting said linkage to drive said shoe toward said brace to clamp said sealing means between said brace and the component; and means for fixing said bracket to said brace at a selected position in said slot with said shoe aligned with the portion of the outer face of the component to be abutted thereby.

2. An assembly according to claim 1, said plate having a port therethrough for passing test fluid into the component, further comprising a vent through said sealing means for exhausting air from the component as test fluid is passed through said port into the component.

3. An assembly according to claim 1, said sealing means comprising a ring having end faces contoured to flushly abut said plate and the component.

4. An assembly according to claim 3, at least one of said end faces having a continuous groove therein, said sealing means further comprising a compressible ring seated in each said groove.

5. An assembly according to claim 1, said pivoting means comprising a piston and cylinder assembly.

6. An assembly according to claim 1, said brace comprising a substantially circular member having a plurality of slots extending radially through a circumferential edge thereof.

7. An assembly according to claim 6, said radial slots being substantially equally displaced about said circumference.

8. An assembly for testing the fluid containment integrity of heat exchanger components independently of the heat exchanger comprising:

a plate of geometric configuration adapted to cover a fluid inlet into the heat exchanger component to be tested, said plate having a port therethrough for passing test fluid into the component;

a substantially circular brace having a plurality of slots extending radially through a circumferential edge thereof for bracing said plate against forces exerted in a direction normal thereto;

means alignable between said plate and the fluid inlet on a continuous path along a perimeter of the fluid inlet for sealing a junction of said plate and the component against passage of test fluid therethrough; and at least one means for clamping said sealing means between said brace and the component comprising:

a shoe adapted to abut a portion of an outer face of the component;

a bracket adapted for slidable engagement in one of said radial slots in said brace a linkage pivotally connecting said shoe and said bracket;

means connected to said bracket and to said linkage for pivoting said linkage to drive said shoe toward said brace; and means for fixing said bracket to said brace in one of said slots at a selected radial displacement.

9. An assembly according to claim 8, said pivoting means comprising a piston and cylinder assembly.

10. An assembly for testing the fluid containment integrity of heat exchanger components independently of the heat exchanger comprising:
frame means for receiving and supporting the component to be tested therein;
a first plate of geometric configuration adapted to cover a first opening on one side of the heat exchanger component to be tested;
a first brace having a plurality of slots therein;
a first shoe adapted to abut a first portion of an outer face of the component;
a first bracket adapted for slidable engagement in one of said slots of said first brace;
a first linkage pivotally connecting said first shoe and said first bracket;
a first means connected to said first bracket and said first linkage for pivoting said first linkage to drive said first shoe toward said first brace to clamp said first sealing means between said first brace and the component; and
first means for fixing said first bracket to said first brace at a selected position in said one of said slots in said first brace with said first shoe aligned with the first portion of the outer face of the component to be abutted thereby;
a second plate of geometric configuration adapted to cover a second opening on an opposite side of the heat exchanger component to be tested as the first opening;
a second brace having a plurality of slots therein;
a second means alignable between said second plate and the second opening on a continuous path along a perimeter of the second opening for sealing a junction of said second plate and the component against passage of test fluid therethrough;
a second shoe adapted to abut a second portion of an outer face of the component;
a second bracket adapted for slidable engagement in one of said slots of said second brace;
a second linkage pivotally connecting said second shoe and said second bracket;
a second means connected to said second bracket and said second linkage for pivoting said second linkage to drive said second shoe toward said second brace to clamp said second sealing means between said second brace and the component; and
second means for fixing said second bracket to said second brace at a selected position in said one of said slots in said second brace with said second shoe aligned with the second portion of the outer face of the component to be abutted thereby.

11. An assembly according to claim 10, said frame means having at least one end slidably mounted thereon for movement toward and away from an opposite end thereof.

12. An assembly according to claim 10 further comprising a test fluid collection reservoir fixed to a lower portion of said frame and extending at least to an outer perimeter thereof.

13. An assembly for testing the fluid containment integrity of heat exchanger components having fluid inlets of various diameters independently of the heat exchanger comprising:
a plate of diameter not less than the fluid inlet diameter of the component to be tested;
a disc-like brace having an outer diameter greater than a largest of the various fluid inlet diameters of the heat exchanger components, said brace having a plurality of slots extending radially through a circumferential edge thereof and an at least frustoconical face opposite said plate;
means for securing said plate against a circular face of said brace;
a circular ring alignable between said plate and the fluid inlet on a continuous path along a perimeter of the fluid inlet for sealing a junction of said plate and the component against passage of test fluid therethrough;
at least two means pivotally connected to said brace for clamping said ring between said brace and the component; and
means connected between said brace and said clamping means for pivoting said clamping means to secure said ring between said brace and the component.

14. An assembly according to claim 11, said radial slots being substantially equally displaced about said circumference.

15. An assembly for testing the fluid containment integrity of heat exchanger components having fluid inlets of various diameters independently of the heat exchanger comprising:
a disc-like brace having an outer diameter greater than a largest of the various outer diameters of the heat exchanger components and a plurality of slots extending radially through a circumferential edge thereof;
a plate of diameter less than said brace outer diameter and not less than the fluid inlet diameter of the component to be tested;
means for securing said plate against a circular face of said brace;
a circular ring alignable between said plate and the fluid inlet on a continuous path along a perimeter of the fluid inlet for sealing a junction of said plate and the component against passage of test fluid therethrough; and
at least two means connected to said brace and to the component for clamping said ring therebetween, at least one said clamping means comprising:
a shoe adapted to abut a portion of an outer face of the component;
a bracket adapted for slidable engagement in one of said radial slots in said brace;
a linkage pivotally connecting said shoe and said bracket;
means connected to said bracket and to said linkage for pivoting said linkage to drive said shoe toward said brace; and
means for fixing said bracket to said brace in one of said slots at a selected radial displacement.

16. An assembly according to claim 15, said pivoting means comprising a piston and cylinder assembly.

17. An assembly for testing the fluid containment integrity of heat exchanger components having fluid inlets of various diameters independently of the heat exchanger comprising:
a disc-like brace having a circular face of outer diameter greater than a largest of the various outer diameters of the heat exchanger components, an opposite at least frustoconical face and a plurality of slots extending radially through a circumferential edge thereof;
a plate of diameter less than said brace outer diameter and not less than the fluid inlet diameter of the component to be tested;
means for securing said plate against said circular face of said brace;

a circular ring alignable between said plate and the fluid inlet on a continuous path along a perimeter of the fluid inlet for sealing a junction of said plate and the component against passage of test fluid therethrough; and at least two means connectable to said brace and to the component for clamping said ring therebetween.

18. An assembly according to claim 17 at least one said clamping means comprising:

a shoe adapted to abut a portion of an outer face of the component;

a bracket adapted for slidable engagement in one of said radial slots in said brace;

a linkage pivotally connecting said shoe and said bracket;

means connected to said bracket and to said linkage for pivoting said linkage to drive said shoe toward said brace; and means for fixing said bracket to said circular member in one of said slots at a selected radial displacement.

19. An assembly according to claim 18, said pivoting means comprising a piston and cylinder assembly, said piston and cylinder assembly having a rod reciprocating on an axis normal to said frustroconical face.

* * * * *